United States Patent

[11] 3,584,657

| [72] | Inventors | Karl-Heinz Dorr;<br>Joachim Ehle; Joachim Wartenberg, all of Essen, Germany |
|---|---|---|
| [21] | Appl. No. | 859,828 |
| [22] | Filed | Sept. 22, 1969 |
| [45] | Patented | June 15, 1971 |
| [73] | Assignee | Fried Krupp Gesellschaft mit beschrankter Haftung<br>Essen, Germany |
| [32] | Priority | Sept. 21, 1968 |
| [33] | | Germany |
| [31] | | P 17 76 108.9 |

[54] FLANGE FOR MULTILAYER CONTAINER
11 Claims, 16 Drawing Figs.

[52] U.S. Cl. .................................................. 138/142,
138/109, 138/143, 138/178
[51] Int. Cl. ...................................................... F16l 9/14
[50] Field of Search........................................... 138/142,
109, 143, 177, 178

[56] References Cited
UNITED STATES PATENTS

| 215,481 | 5/1879 | Rider........................... | 138/109 |
| 1,481,149 | 1/1924 | Quinn........................... | 132/142 |
| 2,669,467 | 2/1954 | Wolferz........................ | 138/142 X |
| 2,681,178 | 6/1954 | Mart............................. | 138/109 X |
| 3,231,338 | 1/1966 | Andrus......................... | 138/143 X |

FOREIGN PATENTS

| 972,115 | 10/1964 | Great Britain................ | 138/132 |

Primary Examiner—Herbert F. Ross
Attorney—Walter Becker

ABSTRACT: The provision of a substantially cylindrical sheet metal body with a flange, in which the sheet metal body is built up of a thin-walled basic pipe and a plurality of superimposed sheet metal layers while the flange proper is built up of additional sheet metal layers which have one end substantially flush with the one end of said sheet metal body, the flange forming superimposed layers being welded to each other and to said sheet metal body while decreasing stepwise in length, i.e. in the axial direction of said sheet metal body.

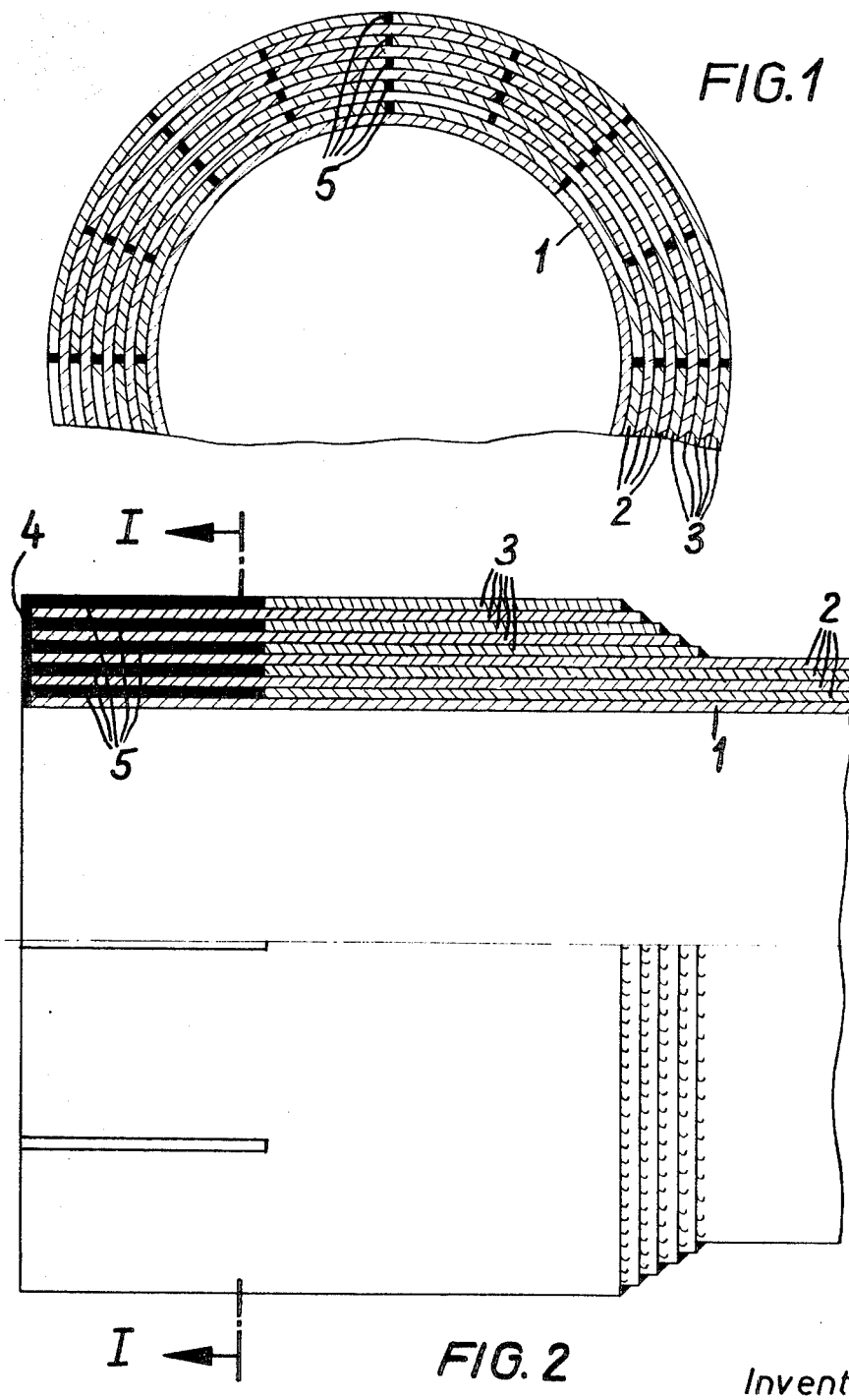

FLANGE FOR MULTILAYER CONTAINER

The present invention relates to a flange for multilayer containers and, more specifically, for cylindrical high pressure sheet metal containers the mantle of which is composed of a basic tubular layer in the form of a pipe which is covered by a plurality of additional layers of sheet metal welded to each other along longitudinal and circumferential seams.

Flanges for high pressure sheet metal containers comprising a plurality of layers are customarily produced as rings of solid material which are forged in a seamless manner. These rings are connected to the basic pipe and the sheet metal layers of the mantle by butt welding. However, the manufacture and connection of such flanges with the container mantle is relatively expensive.

It is, therefore, an object of the present invention to provide a flange for cylindrical high pressure sheet metal containers which will overcome the above-mentioned drawbacks.

It is another object of this invention to provide a flange for cylindrical high pressure sheet metal containers which can be built up simultaneously with the multilayer sheet metal mantle.

These and other objects and advantages of the invention will appear more clearly from the following specification in connection with the accompanying drawings, in which:

FIG. 1 diagrammatically illustrates the fundamental buildup of a multilayer flange according to the invention in cross section.

FIG. 2 shows the fundamental buildup of the multilayer flange of FIG. 1 partly in longitudinal section and partly in side view.

FIGS. 8—11 illustrate various possibilities for connecting a side flange by means of a short pipe and/or by means of a ring of solid material which tapers in steps toward the outside.

Figure 12:
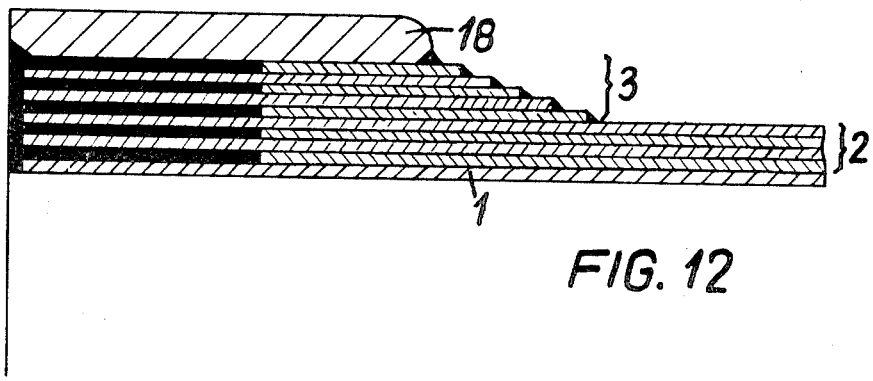
Figure 13:
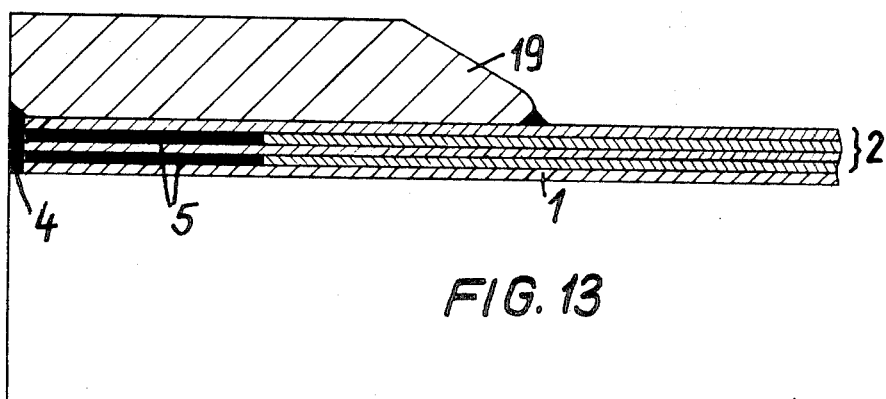

FIGS. 12 and 13 represent multilayer flanges which are additionally surrounded by rings of solid material shrunk onto the multilayer flanges.

A flange for cylindrical high pressure sheet metal containers according to the present invention is characterized in that the flange in addition to comprising the sheet metal layers of the container mantle also comprises a plurality of sheet metal layers arranged at the end of the container mantle and flush with the basic pipe while decreasing in width in steps, said sheet metal layers being welded to each other at the free ends thereof. Such multilayer flange makes it possible to build up the flange during the manufacture of the multilayer container mantle.

Multilayer flanges have heretofore been known only in connection with such multilayer containers which are produced in conformity with the so-called winding method which means they consist of a basic pipe and profiled steel bands which are helically wound over the basic pipe without being welded thereto.

A further feature of the present invention consists in that the sheet metal layers which form the flange are provided with slots or holes offset with regard to each other and adapted when applying the layers, to be filled with welding material whereby the respective layer is connected with the adjacent inner sheet metal layer.

The additionally applied slot or hole weldings will, in view of the shrinkage of the welding material, bring about that the adjacent layers are particularly tightly located one against the other. This is of particular advantage when adjacent layers are to be provided with threaded bores for receiving connecting screws in the container lid. At the same time such an arrangement brings about a particularly favorable transfer of the axial forces from said tightening screws to the respective sheet metal layers.

At the end face of the flange there may be applied either deposit welding or a flat ring welded thereto.

According to a further development of the invention, the sheet metal layers which form the flange may at the very container end be entirely or partly be replaced by a ring of solid material. Such ring has that end thereof which faces the sheet metal layers and which is preferably stepped welded to the individual layers.

Finally, the sheet metal layers forming the flange may also, as it is known per se, be surrounded by a ring of solid material which is shrunk onto the outermost layer.

For purposes of connecting a lateral flange, either a short pipe extending through all sheet metal layers or welded onto the basic pipe may be provided, or an outwardly stepwise tapering ring of solid material may be provided which is inserted into a corresponding opening of the container mantle and is welded to the basic pipe as well as to all flange forming sheet metal layers. In the last-mentioned instance, also an additional short pipe may be provided which is passed through an outer part of the sheet metal layers forming the flange and in its turn is welded to a ring of solid material which is welded to the inner sheet metal layers and to the basic pipe. Expediently, the ring of solid material is prior to its welding to the sheet metal layers forming the flange provided with a deposit weld of preferably tough material.

Referring now to the drawings in detail, the multilayer flange illustrated in FIGS. 1 and 2 comprises a basic pipe 1 and four sheet metal layers 2 which together form the mantle of the multilayer container proper. The multilayer flange furthermore comprises five sheet metal layers 3 of a width which decreases stepwise. The five layers 3 are at the left-hand end of the container additionally welded to each other in such a way that they are substantially flush with the basic pipe 1. At the end face there is provided a deposit weld 4 which extends over the entire thickness of the multilayer flange. The welding seams 5 which extend in longitudinal direction and are offset with regard to each other serve either for connecting the sheet metal plates arranged adjacent to each other in circumferential direction or, as is shown in FIG. 2, for filling special longitudinal slots in said sheet metal plates in order thereby to produce a firmer connection with the respective sheet metal layers adjacent thereto.

Figure 3:
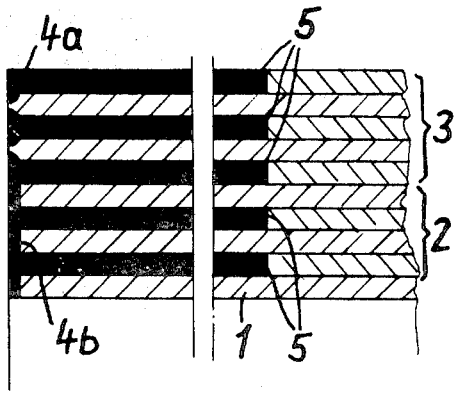
FIGS. 3 and 4 illustrate different designs of the end face of the flange in longitudinal sections.
Figure 4:
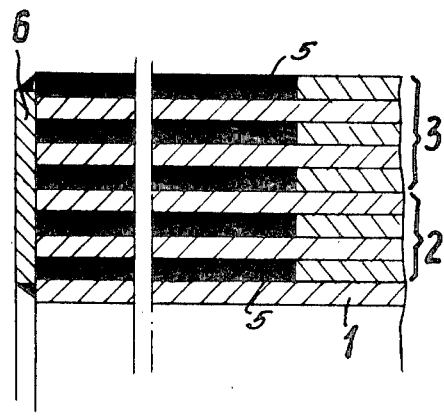
Figure 5A:
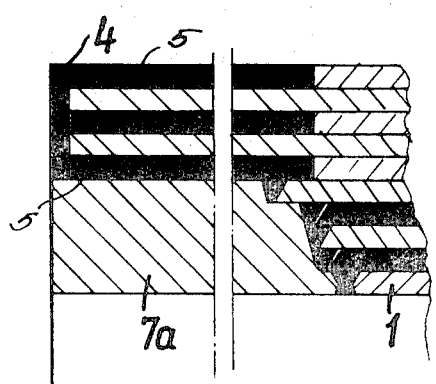
FIGS. 5a, 5b, 5c and 5d illustrate in longitudinal section various possibilities for the assembly of an additional ring of solid material at the end face of the flange.
Figure 5B:
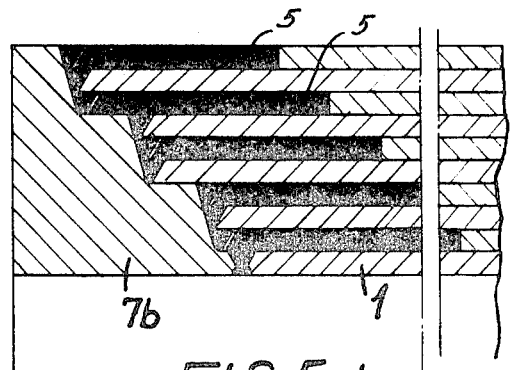
Figure 5C:
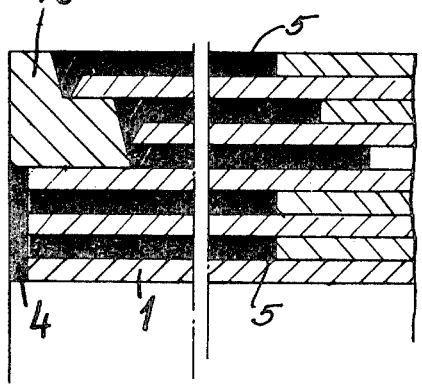
Figure 5D:
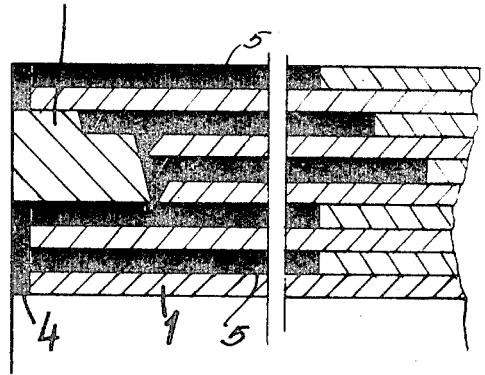

FIG. 3 shows two different designs, namely 4a and 4b, for the welding seam of the deposit weld at the end face of the flange, whereas in FIG. 4 the deposit weld at the end face has been replaced by a welded-on end plate 6.

As illustrated in FIGS. 5a, 5b, 5c and 5d, the sheet metal layers at the end face of the flange may also entirely or partly be replaced by a ring 7a, 7b, 7c and 7d respectively which consists of solid material. The ring 7a has that end thereof which faces the sheet metal layers 2, 3 offset by steps and is welded to the individual layers and, if desired, also to the basic pipe 1. Into this ring there may be cut threaded blind holes which serve for receiving the tightening screws by means of which a container lid or the counter flange of an adjacent container is connected.

Figure 6:
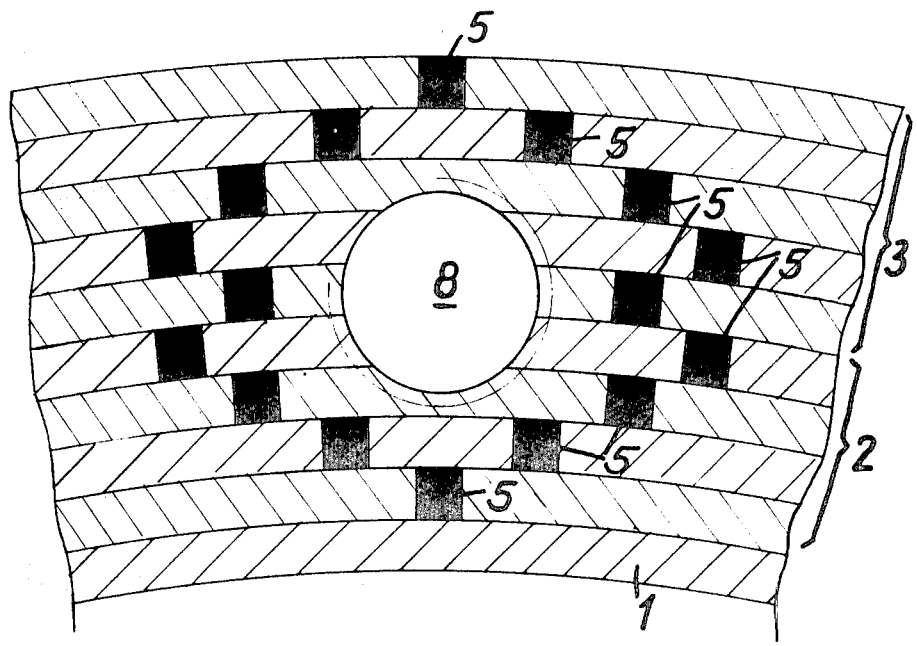
FIGS. 6 and 7 illustrate in cross section and longitudinal section respectively the arrangement of threaded blind holes with slot welding surrounding said blind holes on all sides and arranged in the sheet metal layers.
Figure 7:
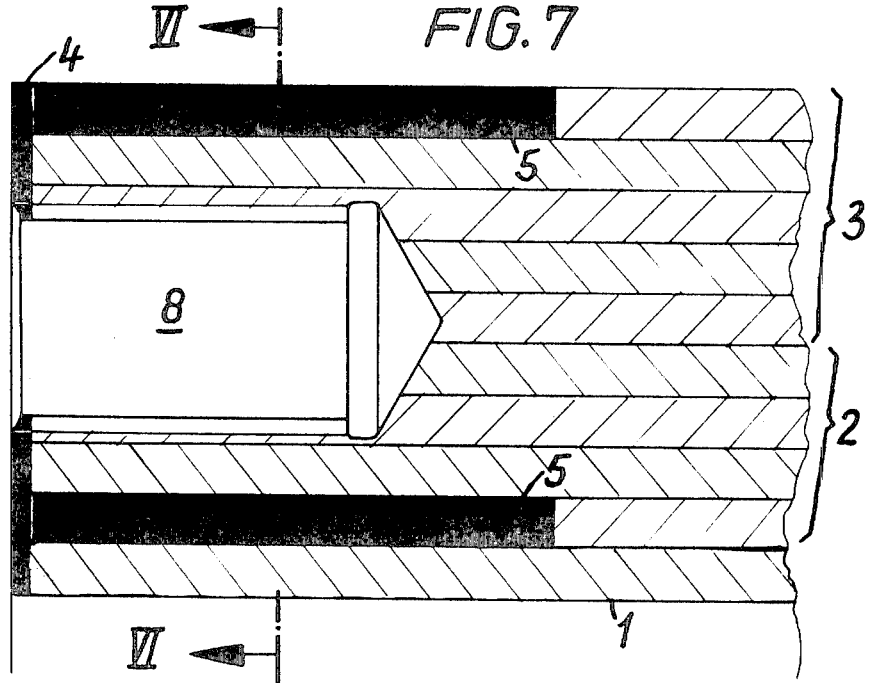

As will be seen from FIGS. 6 and 7, the threaded blind holes 8 may be cut directly into the sheet metal layers 2, 3 which extend to the end face of the container. In these sheet metal layers the longitudinal slots, which are filled with welding material 5, are arranged around the blind holes 8 whereby a reliable seal and a uniform distribution of the axial forces introduced by the tightening screws into the flange will be obtained over the adjacent sheet metal layers.

Figure 8:
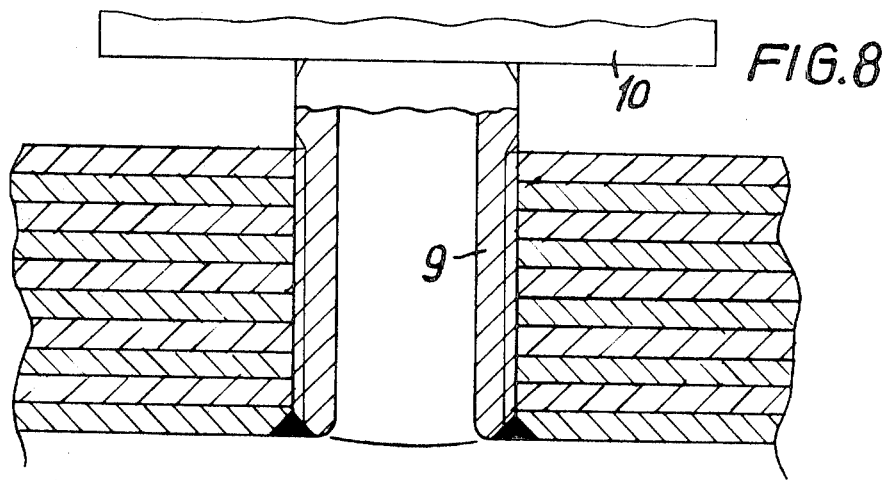
Figure 9:
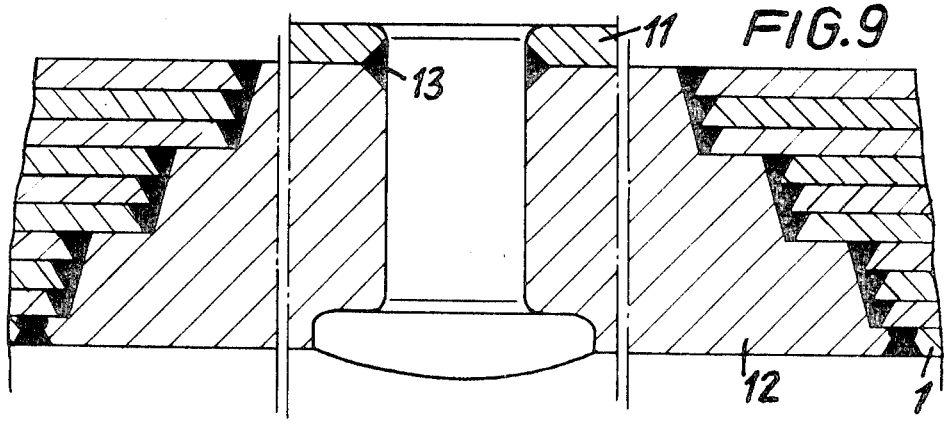

Another possibility of connecting a lateral flange is shown in FIG. 8 according to which a short pipe 9 is passed through the sheet metal layers 2, 3 with or without outer thread and is welded to the basic pipe 1. At the outer end of the short pipe 9 there is provided a threaded flange 10. According to the example of FIG. 9, the lateral flange is designed as a block flange 11. This block flange 11 is connected by an annular welding seam 13 with an outwardly stepwise decreasing solid ring 12 which is inserted into a correspondingly designed opening of the container mantle, ring 12 being welded to the basic pipe 1 and to all sheet metal layers 2 and 3.

Figure 10:
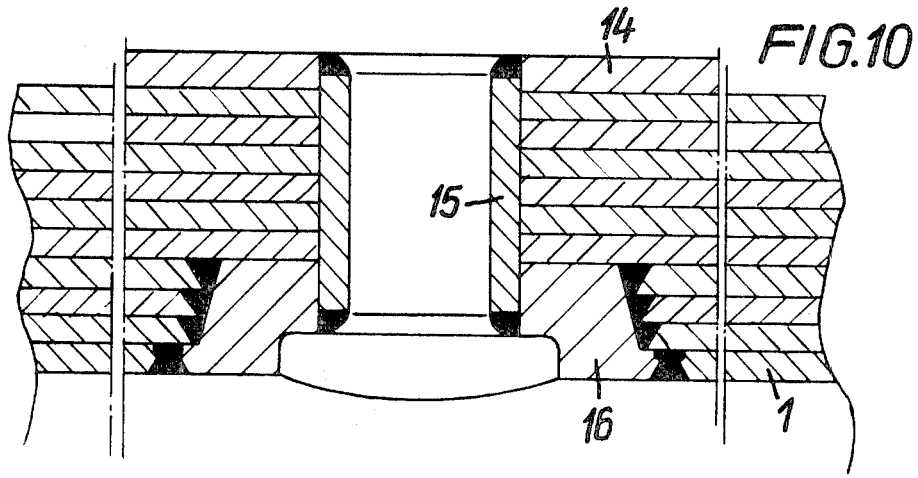
Figure 11:
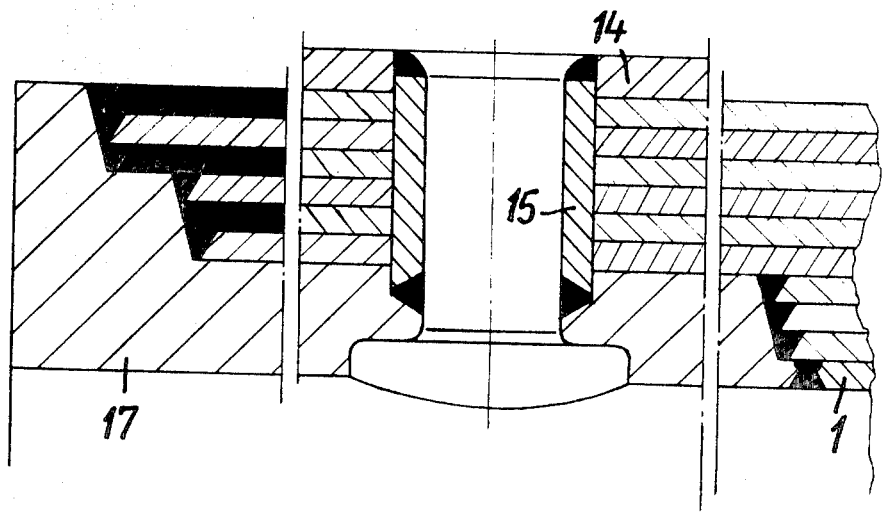

FIG. 10 shows an arrangement with block flange 14, pipe section 15 and ring 16 of solid material. According to FIG. 11, the said ring 16 has an extension in the shape of a ring 17 which forms the end face of the container.

According to the embodiments of FIG. 12, the multilayer flange composed of sheet metal layers 2 and 3 is additionally surrounded by a ring 18 of solid material which is shrunk onto said flange and at its end face is welded to the outermost sheet metal layer.

According to the example of FIG. 13, the flange consists merely of the sheet metal layers 2 of the container mantle, which layers 2 are at the end faces thereof provided with longitudinal slots which are filled with welding seams 5, and a ring 19 of solid material shrunk directly onto the welding seams 5.

It is, of course, to be understood that the present invention is, by no means, limited to the showing in the drawings but also comprises any modifications within the scope of the appended claims.

What we claim is:

1. A substantially cylindrical sheet metal body, especially high pressure resistant body, which comprises: a relatively thin-walled basic pipe body, a plurality of superimposed first sheet metal layers surrounding said pipe body and welded thereto and to each other, and flange means formed by portions of said first sheet metal layers and including second superimposed sheet metal layers having their ends substantially flush with one end of said first sheet metal layers and welded thereto, said second superimposed sheet metal layers decreasing by steps in the direction of the axial length of said pipe body.

2. A sheet metal body according to claim 1, in which said first and second superimposed sheet metal layers at their said one end are provided with apertures which are so arranged that the apertures of directly adjacent sheet metal layers are offset with regard to each other in the circumferential direction of said sheet metal body, said apertures being filled with weld.

3. A sheet metal body according to claim 2, in which said apertures are formed by slots.

4. A sheet metal body according to claim 1, which includes threaded blind hole means arranged at said one ends of said first and second superimposed sheet metal layers and surrounded by the weld in said apertures.

5. A sheet metal body according to claim 1, in which the end face of said sheet metal body at the said one end of said first and second sheet metal layers is at least in part formed by a ring of solid material welded to said first and second sheet metal layers.

6. A sheet metal body according to claim 5, in which said ring has those end faces thereof stepped which face the adjacent sheet metal layers.

7. A sheet metal body according to claim 1, which includes a pipe section extending through said first and second sheet metal layers and communicating with the interior of said basic pipe body for connection to a lateral flange, said pipe section being welded to said sheet metal body.

8. A sheet metal body according to claim 7, in which said pipe section is welded to said basic pipe body.

9. A sheet metal body according to claim 1, which includes a passage extending from the outside of said sheet metal body to the interior thereof through all of said sheet metal layers and said basic pipe body and having a stepwise increasing diameter, and an annular body having its lateral surfaces contoured in conformity with the contour of said passage and inserted into the latter, said annular body being welded to said first and second sheet metal layers and said basic pipe body and being adapted to be connected to a lateral flange.

10. A sheet metal body according to claim 1, which includes an annular member tapering in the direction from its inside diameter to its outside diameter and inserted in said basic pipe body and adjacent said first sheet metal layers, said annular member having a passage therethrough extending from the outside thereof to the interior of said annular member, and a pipe section extending from the outside of said sheet metal body into said passage for connection with a lateral flange, said pipe section and said annular member being welded to each other, and said annular body being welded to said basic pipe body and adjacent first sheet metal layers.

11. A sheet metal body according to claim 1, which includes ring means shrunk onto and welded to the outermost one of said second sheet metal layers.